United States Patent
Rodes

(10) Patent No.: US 11,801,520 B2
(45) Date of Patent: Oct. 31, 2023

(54) CABLE DRIVEN SPRINKLER

(71) Applicant: Lynn Rodes, Rochester, IN (US)

(72) Inventor: Lynn Rodes, Rochester, IN (US)

(73) Assignee: Lynn Rodes, Rochester, IN (US)

(*) Notice: Subject to any disclaimer, the term of this patent is extended or adjusted under 35 U.S.C. 154(b) by 288 days.

(21) Appl. No.: 17/317,959

(22) Filed: May 12, 2021

(65) Prior Publication Data

US 2021/0354151 A1 Nov. 18, 2021

Related U.S. Application Data

(60) Provisional application No. 63/023,430, filed on May 12, 2020.

(51) Int. Cl.
| | | |
|---|---|---|
| *B05B 3/18* | (2006.01) | |
| *B05B 3/02* | (2006.01) | |
| *A01G 25/09* | (2006.01) | |
| *B05B 13/00* | (2006.01) | |

(52) U.S. Cl.
CPC ............... *B05B 3/18* (2013.01); *A01G 25/09* (2013.01); *B05B 3/02* (2013.01); *B05B 13/005* (2013.01)

(58) Field of Classification Search
CPC ........... B05B 3/18; B05B 9/02; B05B 13/005; A01G 25/09; A01G 25/095
USPC .................................................. 239/747, 738
See application file for complete search history.

(56) References Cited

U.S. PATENT DOCUMENTS

| | | | | |
|---|---|---|---|---|
| 1,215,081 A * | 2/1917 | Todd et al. | ............. | B05B 1/083 239/747 |
| 2,249,211 A * | 7/1941 | Johnson | ................. | A01G 25/09 239/747 |
| 2,985,380 A * | 5/1961 | Rosenkranz | ........... | A01G 25/09 74/436 |
| 3,085,751 A * | 4/1963 | Warrick | ................. | A01G 25/09 239/746 |
| 3,377,027 A * | 4/1968 | Mattson | ............... | A01G 25/095 D23/219 |
| 3,623,663 A * | 11/1971 | Koinzan | .............. | A01G 25/092 239/731 |
| 3,774,848 A * | 11/1973 | Herrick | ..................... | B05B 3/18 239/289 |
| 3,811,617 A * | 5/1974 | Cornelius | .............. | A01G 25/09 239/733 |
| 3,841,561 A * | 10/1974 | Lacey | .................. | A01G 25/095 239/747 |
| 4,003,519 A * | 1/1977 | Kruse | .................. | A01G 25/095 242/390.6 |

(Continued)

*Primary Examiner* — Joseph A Greenlund
(74) *Attorney, Agent, or Firm* — Sanders Pianowski LLP

(57) ABSTRACT

A cable driven irrigation device has a frame that acts as a manifold to supply a sprinkler head and a separate spray nozzle. The frame is supplied with an externally triggered latching valve. The valve is held in the open position by a spring and has an internal flap that enters the flow of water through the valve when the external trigger is moved. The water flow moves the flap to the closed position and holds it there until the water pressure is removed. The spray nozzle dispenses water onto an exposed turbine which drives a gearbox. The gearbox is coupled to a spool which can wind up a cord. The spool being wound is what pulls the sprinkler along. A knot near the end of the cord engages the external trigger to stop the flow of water into the frame.

19 Claims, 7 Drawing Sheets

(56) References Cited

U.S. PATENT DOCUMENTS

| | | | | | |
|---|---|---|---|---|---|
| 4,151,858 | A * | 5/1979 | Courtright | ............ | A01G 25/095 239/738 |
| 4,174,809 | A * | 11/1979 | Arlemark | ............. | A01G 25/095 137/355.2 |
| 4,186,881 | A * | 2/1980 | Long | .................... | A01G 25/095 137/355.19 |
| 4,254,912 | A * | 3/1981 | Lebrun | ................ | A01G 25/095 239/747 |
| 4,346,842 | A * | 8/1982 | Botha | ................ | A01G 25/095 239/747 |
| 5,711,490 | A * | 1/1998 | Hansinger | ............ | A01G 25/095 239/197 |
| 6,007,402 | A * | 12/1999 | Nelson, II | ............. | A63H 29/14 446/176 |
| 6,604,697 | B1 * | 8/2003 | Heren | .................... | A01G 25/09 239/722 |
| 6,637,679 | B1 * | 10/2003 | Duncan | .................... | B05B 3/06 239/289 |
| 6,745,959 | B2 * | 6/2004 | Reid | ........................ | B05B 3/06 239/722 |
| 7,300,004 | B2 * | 11/2007 | Sinden | ................. | A01G 25/097 239/722 |
| 7,802,738 | B2 * | 9/2010 | Sinden | ................. | A01G 25/097 239/722 |
| 9,144,203 | B2 * | 9/2015 | Nelson | ................. | A01G 25/097 |
| 10,232,389 | B1 * | 3/2019 | Forrest | .................... | B05B 1/323 |
| 10,252,281 | B2 * | 4/2019 | Chen | .................... | B05B 3/0481 |
| 10,973,180 | B2 * | 4/2021 | Qiu | ........................ | B05B 9/007 |
| 2002/0030128 | A1 * | 3/2002 | Reid | ........................ | B05B 3/06 239/722 |
| 2020/0128766 | A1 * | 4/2020 | Qiu | ....................... | B65H 75/4489 |
| 2021/0000026 | A1 * | 1/2021 | Qiu | ....................... | B05B 9/0403 |
| 2021/0354151 | A1 * | 11/2021 | Rodes | ....................... | B05B 3/18 |

* cited by examiner

CABLE DRIVEN SPRINKLER

CROSS REFERENCE TO RELATED APPLICATIONS

This application claims the benefit of U.S. Provisional Application No. 63/023,430, filed May 12, 2020, the disclosures of which are hereby incorporated by reference.

BACKGROUND OF THE INVENTION

This present disclosure relates to sprinklers and devices for controlled watering of an area, such as a lawn, garden, or crop. Sprinklers can be fixed or mobile, with the mobility of the sprinkler frequently being dictated by the size and shape of the area to be watered. Many mobile sprinklers have been designed to cover a large area but are frequently overly complicated. Some devices use the rotation of a sprinkler head to drive a series of pulleys or gears to propel the device forward. Others will pull on a supply hose or use the wheels to propel the device. In some terrain, the wheel driven devices can become easily stuck and create a mess. Some use a cable or rope to pull the sprinkler along a path, but these can be difficult to use and complex. An improved device is needed.

SUMMARY OF THE INVENTION

The present disclosure describes a cable driven sprinkler driven by an exposed water wheel that is coupled to a gearbox. The water wheel is driven by an adjustable spray nozzle that is connected to the same water supply as the sprinkler head. The gearbox drives a releasable take-up wheel or drum that winds up the cable. As the cable is wound up, a knot or captured lug near the end of the cable engages a linkage connected to the shutoff valve with an aperture that is smaller than the knot. The shutoff valve is an externally triggered latching valve. The triggering happens when the knot engages the linkage. As the take-up wheel continues to pull on the cable, it moves the knot further towards the valve, which moves a spring-loaded internal flap into the flow of water into the frame. The flow of water catches the internal flap, rapidly moving it to the closed position and holding it there with water pressure. This shuts off the water supply to the spray nozzle and sprinkler head. The shut-off valve remains closed even if the tension is released on the cable, and temporarily removing the water supply resets the valve to the open position.

DESCRIPTION OF THE PREFERRED EMBODIMENT

Figure 1:
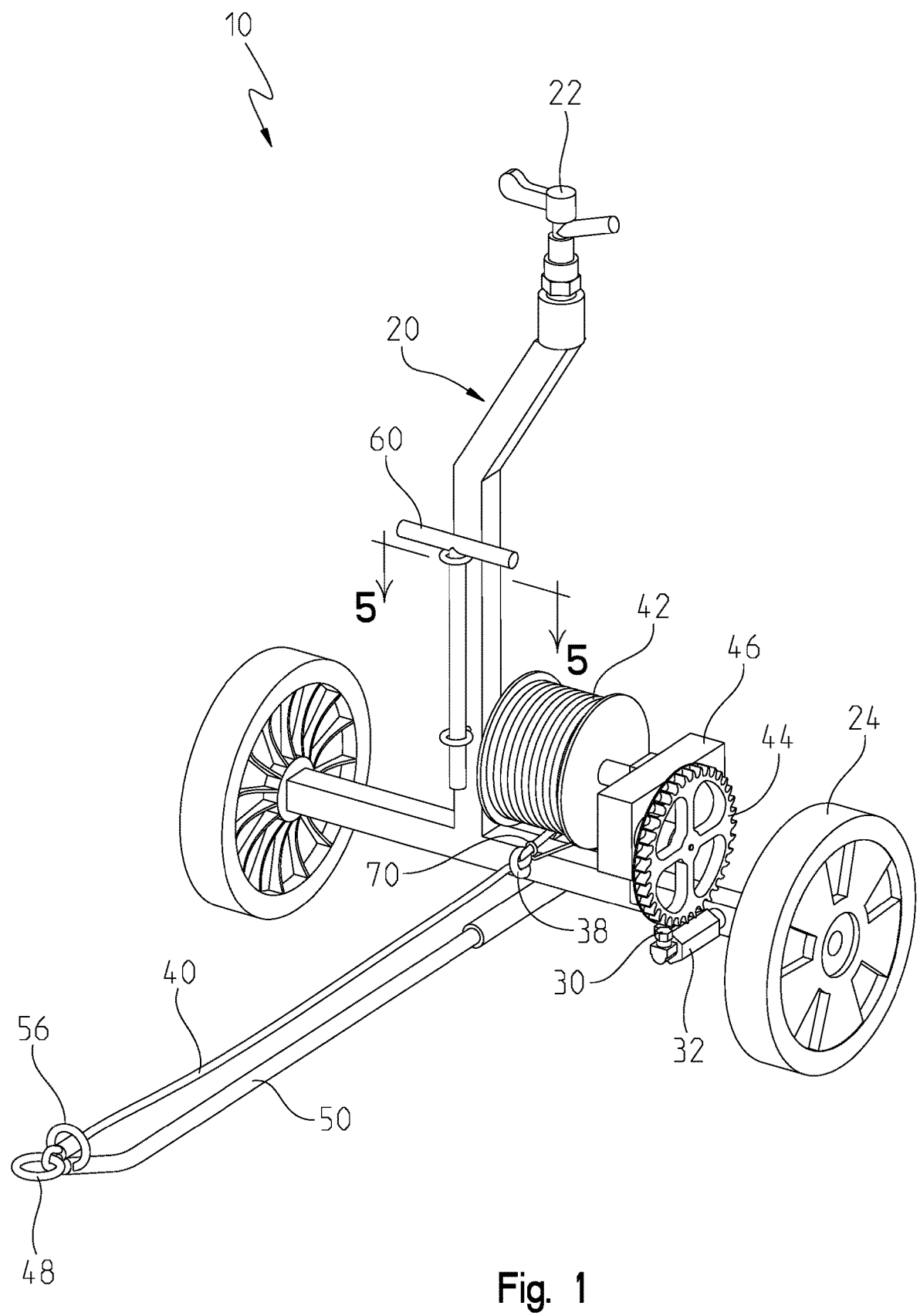
FIG. 1 is a front isometric view of the sprinkler.
Figure 2:
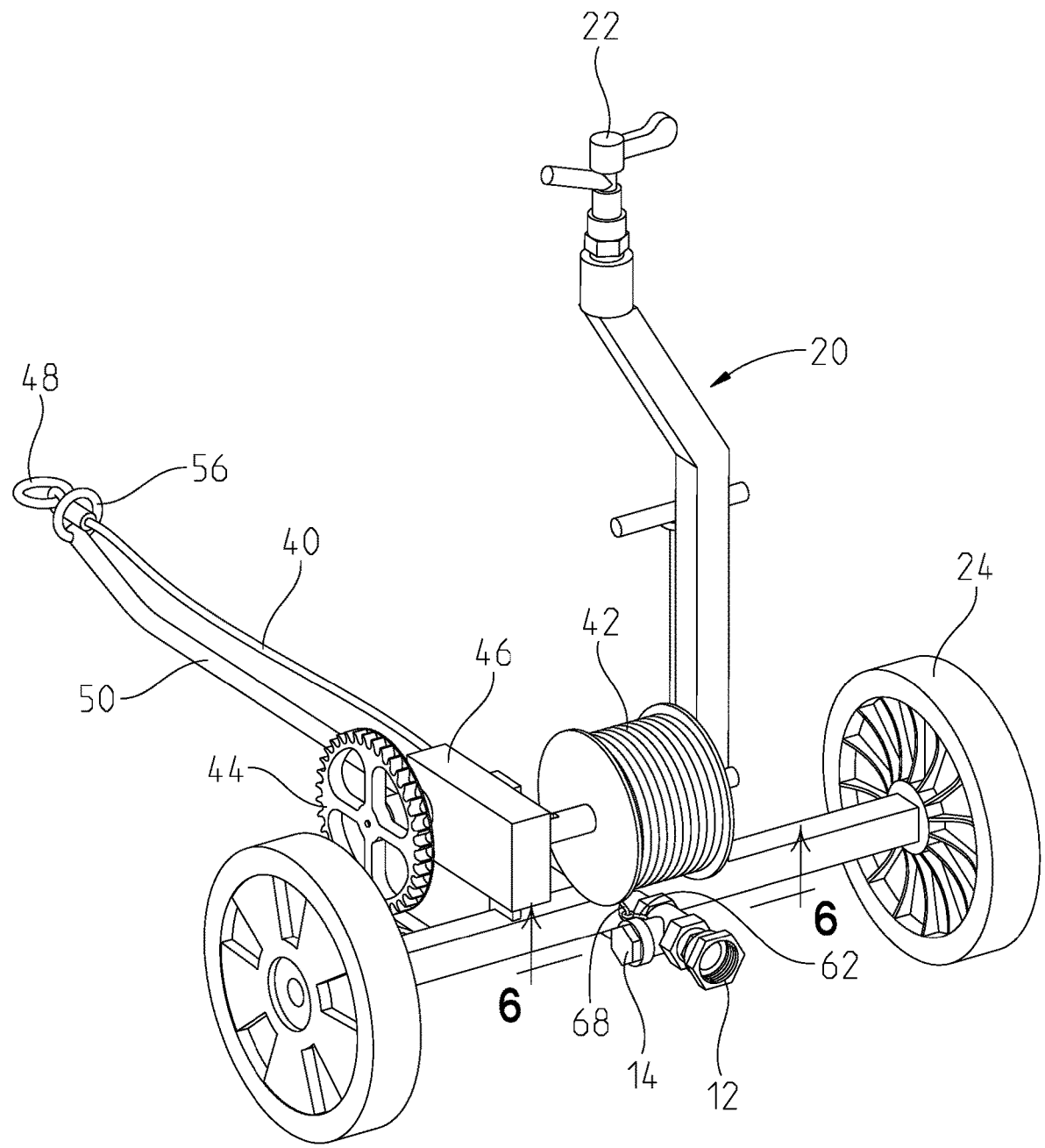
FIG. 2 is a rear isometric view of the sprinkler.
Figure 3:
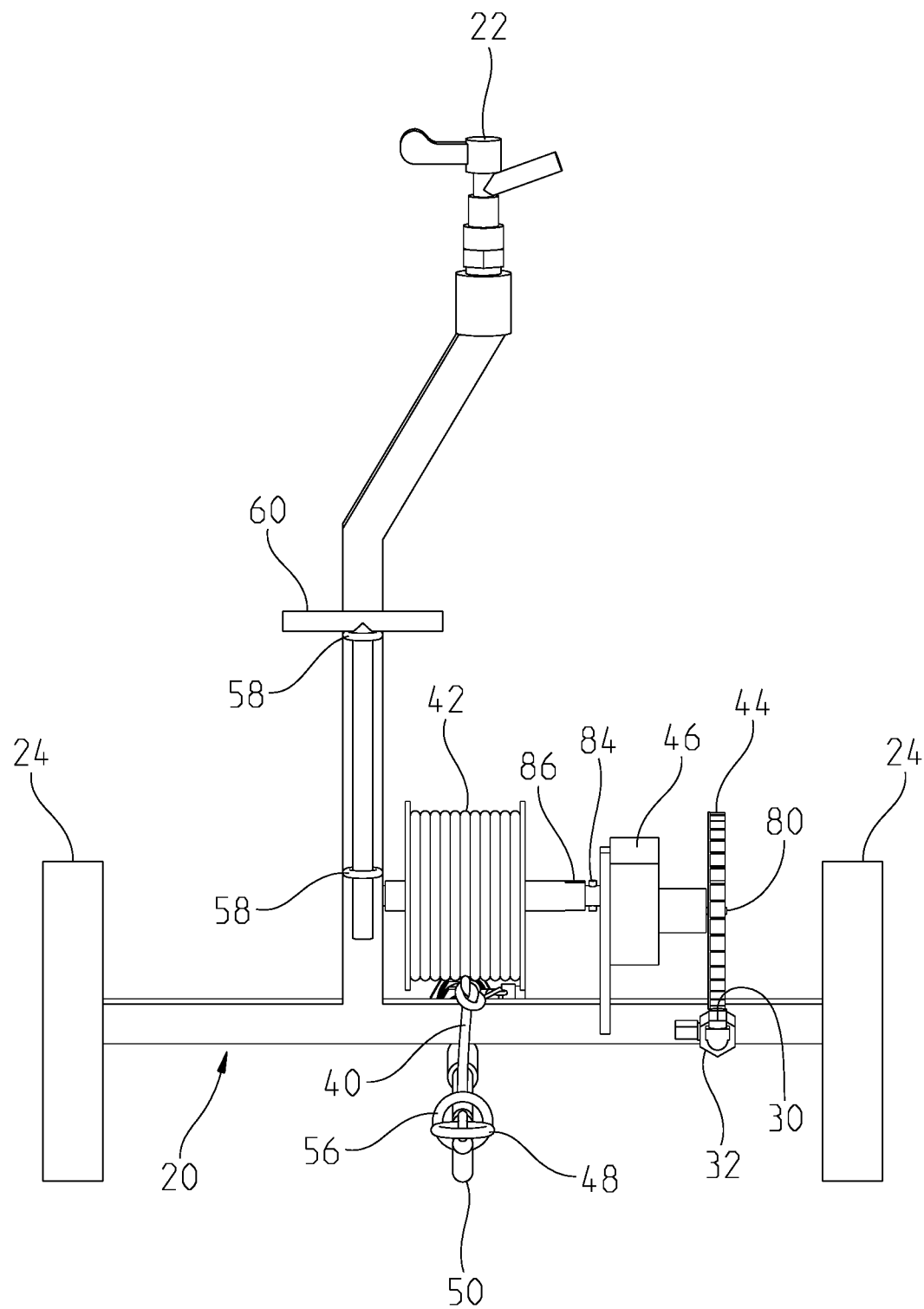
FIG. 3 is a front view of the sprinkler.
Figure 4:
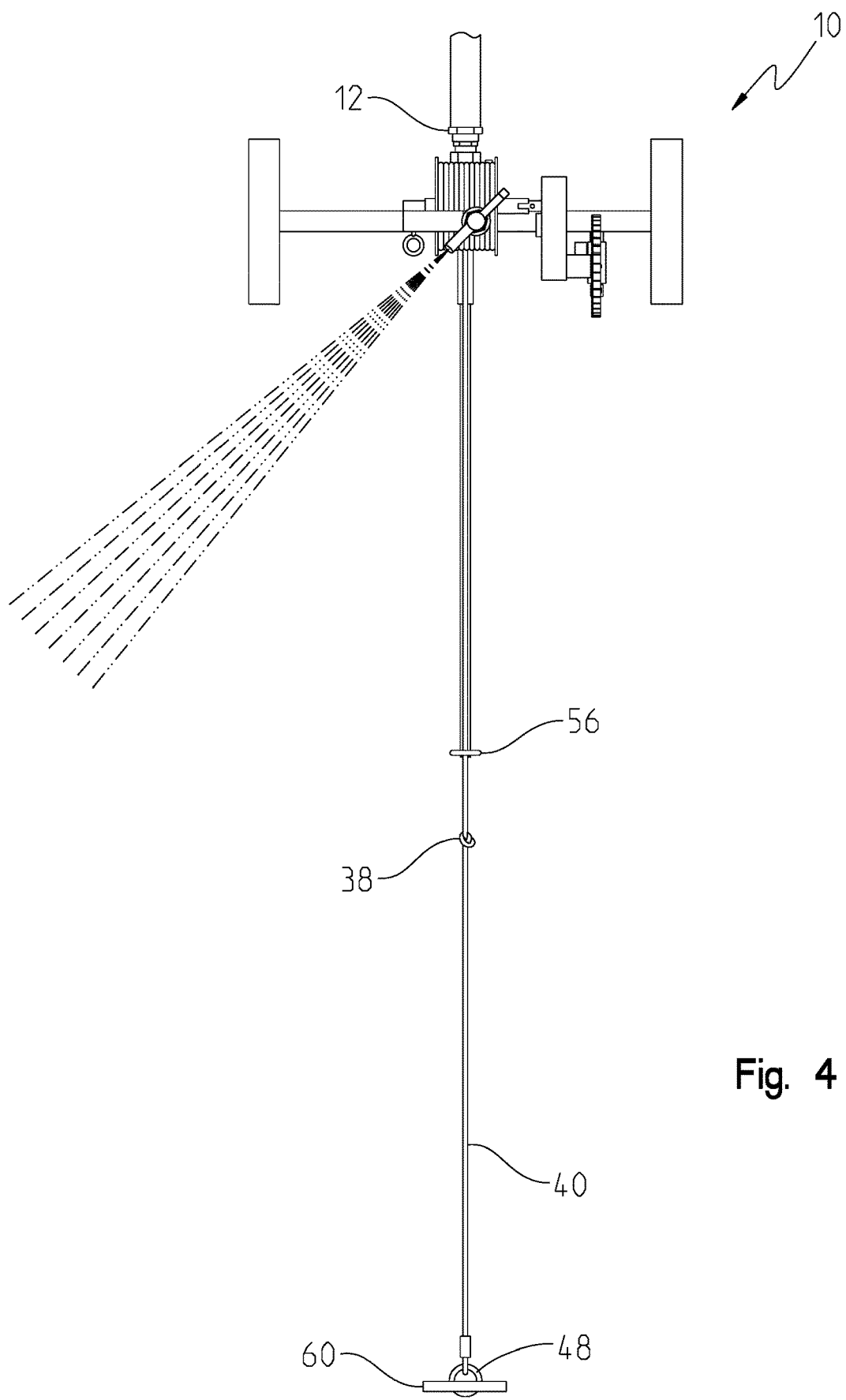
FIG. 4 is a top view of the sprinkler.
Figure 5:
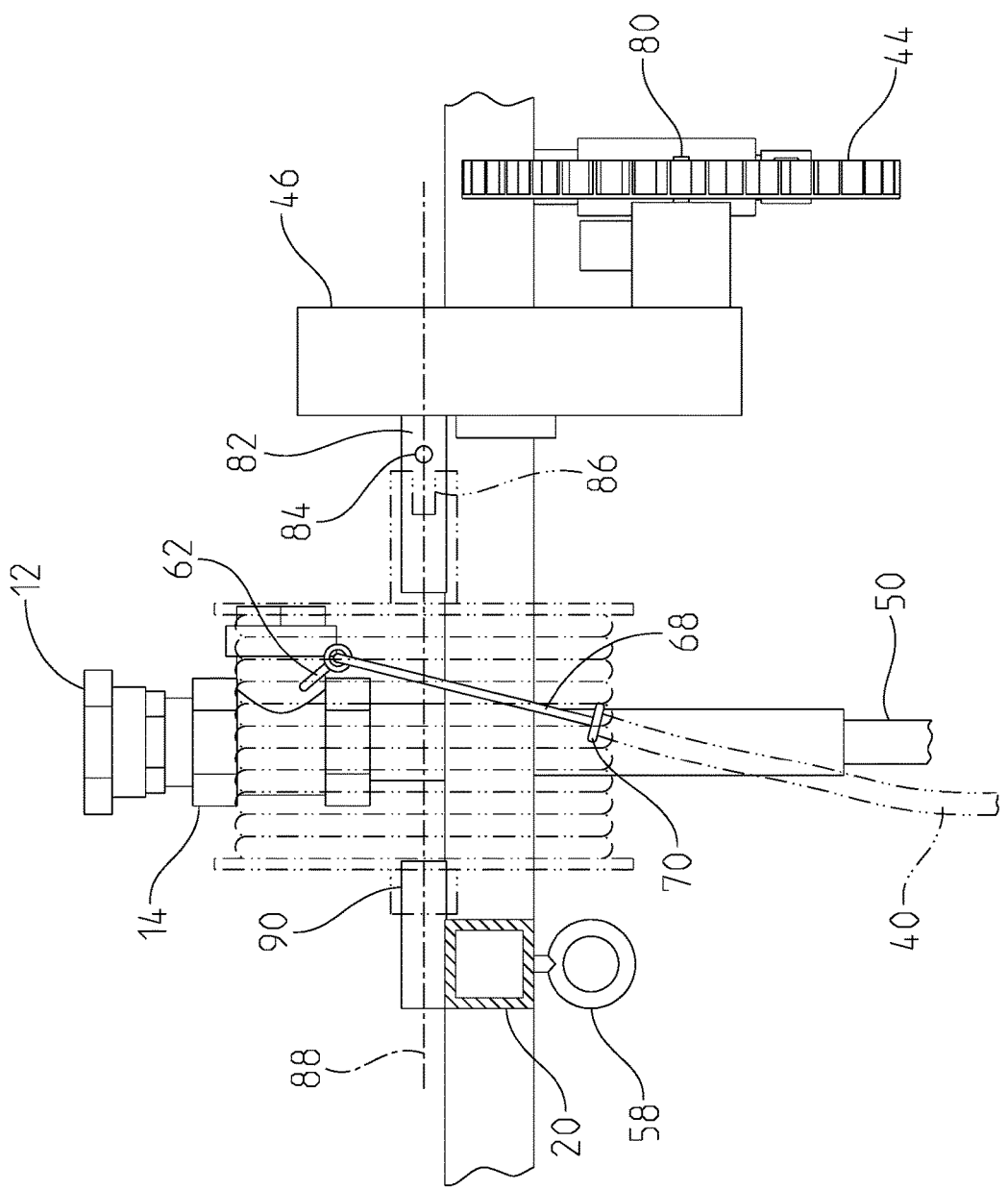
FIG. 5 is partial view 5 of the sprinkler with the spool in hidden lines.
Figure 6:
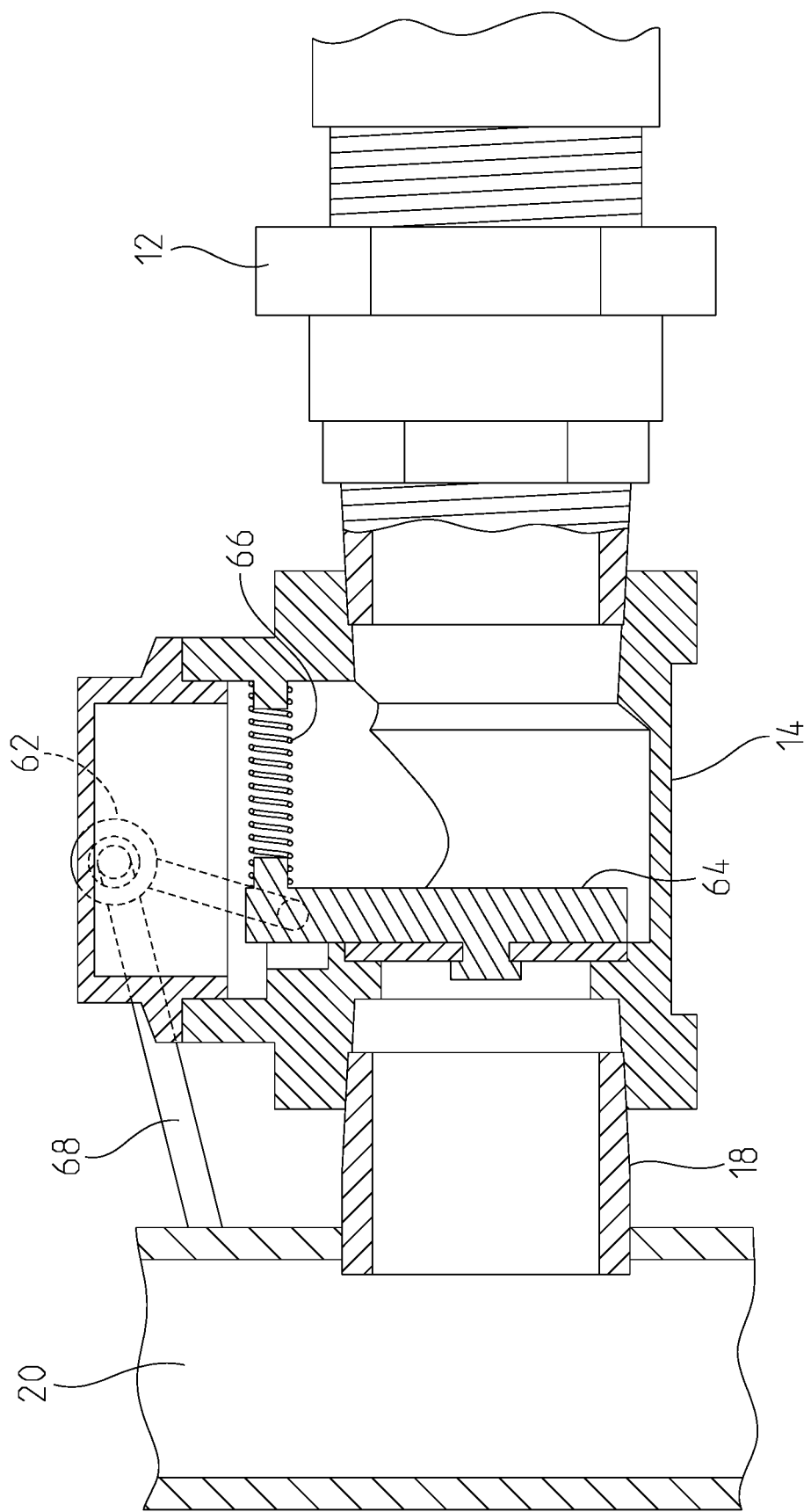
FIG. 6 is a section view 6-6 of the shutoff valve in the closed position.
Figure 7:
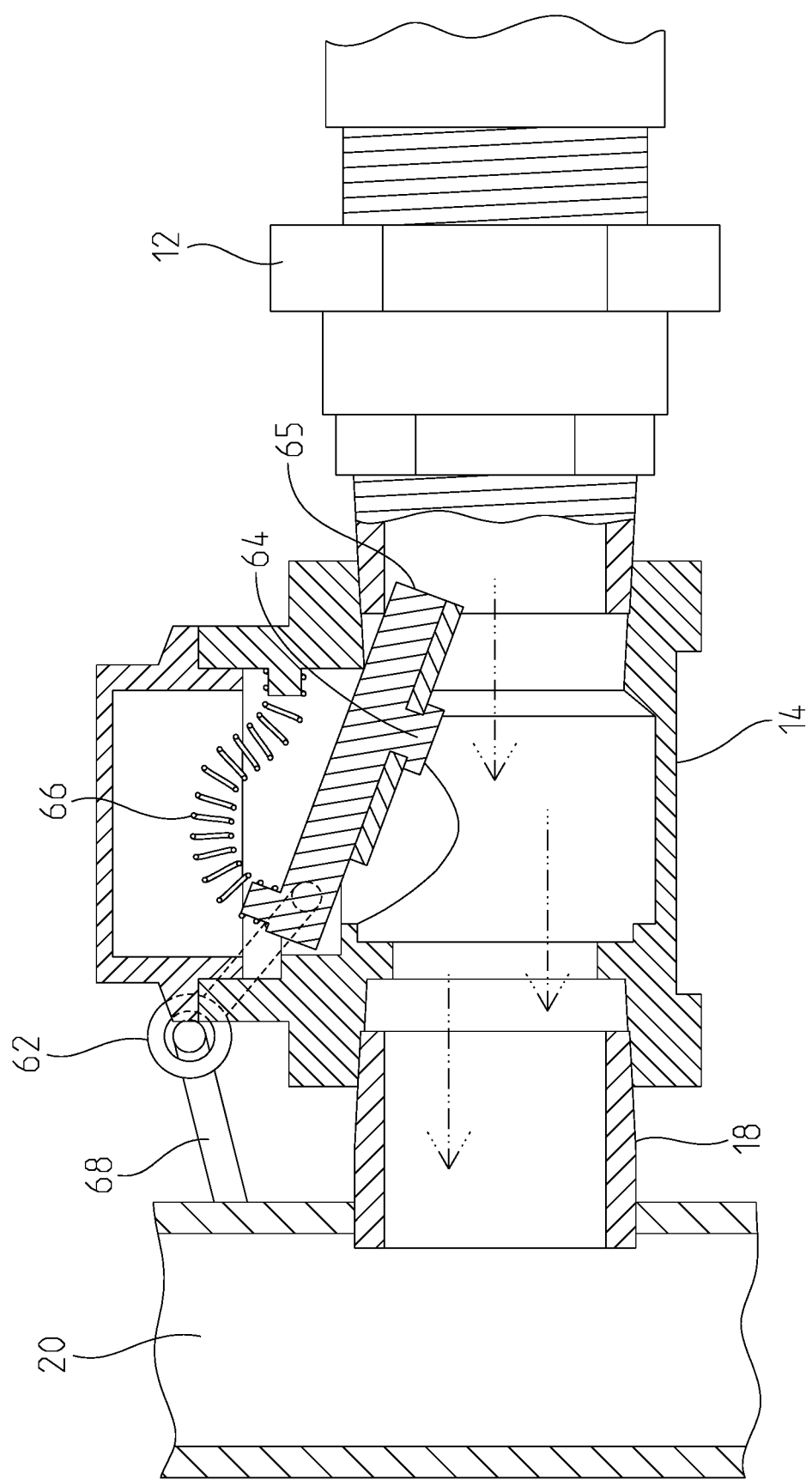
FIG. 7 is a section view 6-6 of the valve in FIG. 6 in the open position.

A sprinkler 10 is shown in FIGS. 1-7 is hooked up to a water supply (not shown) at a valve inlet 12. A shut off valve 14 is movable between an open position as shown in FIG. 7 and a closed position as shown in FIG. 6. In the open position, the valve 14 connects the water supply (not shown) to the hollow frame 20 at a manifold inlet 18. The hollow frame 20 acts as a manifold that distributes water from the manifold inlet 18 to a sprinkler head 22 and a nozzle 30. It is contemplated that the frame 20 is merely structural and does not act like a manifold. In that case, the valve 14 would be separately connected to the sprinkler head and nozzle. The flow of water to the nozzle 30 is controlled by a speed control valve 32. The sprinkler head 22 is shown as a rotating impact style, but other styles are contemplated. The function and style of the sprinkler head is not tied to any form of propulsion.

For propulsion, the sprinkler 10 is pulled by a cable or cord 40 that is wound onto a drum or spool 42. An exposed turbine wheel 44 is mated to an input shaft 80 on a gearbox 46 which is coupled to the spool 42 at an output shaft 82. The output shaft 82 has a tang 84 that engages with a slot 86 on the spool 42. The gearbox 46 reduces the input speed of the wheel 44 to turn the spool 42 at a much lower rate with more torque. For example, the gearbox 46 as shown has a ratio of 900:1, with other ratios contemplated, based on size of the sprinkler 10 and the speed desired by the user. The spool 42 rotates about a rotational axis 88 and is supported by a fixed shaft 90 on the frame 20 on one end and the output shaft 82 on the other end. The spool 42 can be decoupled from the gearbox 46 by sliding it along its rotational axis to disengage the pin on the output shaft 82 of the gearbox. Decoupling the spool 42 allows the cord 40 to be wound or unwound by hand. This coupling is shown in FIG. 5.

The frame 20 is primarily supported by wheels 24 that rotate freely and a front sled 50. The front sled 50 is connected to the frame 20. The front sled 50 provides stability and guides the sprinkler 10 as the spool winds up the cord 40. The valve 14 acts as an externally triggered latching valve that is spring-loaded to be normally open. As shown in FIG. 5, valve 14 has an external trigger shaft 62 that is directly connected to an internal flap 64. In the design shown in the FIGS., the internal flap 64 rotates between an open position and a closed position. In the open position, the flap 64 is clear or mostly clear of the flow path of the water passing through the valve 14. The internal flap 64 is biased to the open position by a spring 66. The external trigger shaft 62 is connected to a trigger linkage 68. The far edge 65 of the flap 64 faces the valve inlet 12 such that if the flap 64 is rotated towards the closed position by the trigger shaft 62, the far edge 65 enters the flow path, and when enough of the water moving through the valve overcomes the spring 66, the flow of water pulls the flap to the closed position. The trigger linkage 68 has an aperture 70 that the cord 40 passes through. Near the end of cord is a knot 38 that is larger than the aperture 70. As the spool 42 winds the cord 40, when the knot 38 meets the aperture 70, the knot 38 moves the trigger linkage 68, which moves the external trigger shaft 62. The knot 38 may be a physical knot, lump, molded block, or other feature on the cord 40 that engages with and moves the trigger linkage 68 and/or aperture 70.

At the end of the cord 40 is a ring 48 that is larger than a window 56 that is affixed to the end of the sled. The cord 40 passes through the window 56. The ring 48 keeps the cord 40 from becoming unthreaded from the sled 50 and acts to guide the sprinkler 10 as the spool 42 winds the cord 40. The knot 38 is always located between the ring 48 and the aperture 70.

To set up the sprinkler 10, the spool 42 is decoupled from the gearbox 46 and the cord is extended. Extending the cord 40 moves the knot 38 away from the aperture 70 and allows the spring 66 to return the flap 64 to the open position. The valve 14 is in the open position as shown in FIG. 7. A stake 60, normally stored on the frame and held in place by eyelets 58, is removed from the eyelets 58 pushed into the ground to trap the ring 48. The gearbox 46 is coupled to the spool 42. The water supply is connected to the valve inlet 12, and the sprinkler head 22 is adjusted according to the needs of the user and the area to be irrigated. The valve 14 remains in the open position during irrigation.

In operation, the ring 48 is affixed to the ground, the water supply is turned on, and supplying the valve inlet 12, and the valve 14 is in the open position. The frame 20 is pressurized, with the sprinkler head 22 irrigating. The nozzle 30 is spraying the turbine wheel 44, which in turn, rotates the gearbox 46. The user can adjust the speed of the spool 42 by adjusting the speed control valve 32. A higher flow through the valve 32 means a higher turbine wheel 44 speed, which translates to the spool 42 winding the cord 40 at a higher rate. The spool 42 is slowly winding up the cord 40, which, under tension, pulls the sprinkler 10 closer to where the ring 48 is affixed. The sled 50 lightly drags on the ground and the wheels 24 rotate and support the frame 20.

As the spool 42 continues to wind up the cord 40, the knot 38 on the cord 40 makes contact with the window 56, which begins to move the valve towards the closed position. As the valve linkage moves further towards the closed position, the flap, previously held open with the spring 66, begins to swing into the flow path, where it is then caught by the flowing water and moved to the closed position, shown in FIG. 7. The flowing water snaps the valve 14 to the closed position, allowing a crisp and affirmative cutoff of the water supply to the sprinkler head 22 and nozzle 30. By having an affirmative cutoff of the water supply, leakage and shutoff issues occurring at the end of irrigation are eliminated. Even if the knot 38 is moved away from the aperture 70, the water pressure supplied to the valve inlet 12 holds the internal flap 64 closed. To reset the valve, the user decouples the spool and adds slack to the cord 40 to move the knot 38 away from the aperture 70 removes the water pressure, allowing the spring 66 to reset the flap 64 to the open position.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A sprinkler for being connected to a water supply, said sprinkler comprising:
   a shutoff valve having a valve inlet, said shutoff valve having a flap pivotable between an opened position and a closed position, in said opened position, said valve inlet is in fluid communication with a manifold inlet, in said closed position, said flap obstructs fluid communication between said valve inlet and said manifold inlet, said flap connected to a trigger shaft and biased towards said open position by a spring;
   a hollow frame in fluid communication with said manifold inlet, said hollow frame having a speed control valve in fluid communication with said manifold inlet and connected to a nozzle, said hollow frame having a sprinkler head in fluid communication with said manifold inlet;
   a sled affixed to said hollow frame and having a window located at a terminal end;
   an exposed turbine wheel located adjacent to said nozzle, said exposed turbine wheel connected to a gearbox, said gearbox selectively coupled to a spool;
   a cord having a ring located on a terminal end, said cord connected to said spool on an end opposite said ring, said cord passing through said window on said sled, said ring being larger than said window, said cord passing through an aperture on a trigger linkage, said trigger linkage coupled to said trigger shaft on said shutoff valve;
   said cord having a knot smaller than said ring and larger than said aperture, said knot located between said ring and said aperture;
   when said shutoff valve is in said open position and said water supply is connected, said nozzle dispenses water to said exposed turbine wheel to rotate said exposed turbine wheel, said exposed turbine wheel for rotating said gearbox, said gearbox for rotating said spool to wind up said cord; and
   when said spool winds up said cord and said ring is close to said window, said knot engages with said aperture to rotate said flap from said open position towards said closed position.

2. The sprinkler of claim 1, wherein sliding said spool along a rotational axis decouples said spool from said gearbox.

3. The sprinkler of claim 1, wherein said spool is supported by a fixed shaft affixed to said hollow frame on one side and an output shaft of said gearbox on another side, said spool is slidable along said shafts between a coupled position and a decoupled position, said coupled position defined by a pin on said output shaft engaged with a slot in said spool, said decoupled position defined by said pin being clear of said slot in said spool.

4. The sprinkler of claim 1, wherein said spring is located internally to said shutoff valve.

5. The sprinkler of claim 1, further comprising wheels freely rotatably affixed to said frame.

6. The sprinkler of claim 1, wherein said trigger linkage is located between said spool and said frame.

7. A sprinkler for being connected to a water supply, said sprinkler comprising:
   a shutoff valve having a valve inlet, said shutoff valve having a flap pivotable between an opened and a closed position, in said opened position, said valve inlet is in fluid communication with a manifold inlet on a frame, in said closed position, said flap obstructs fluid communication between said valve inlet and said manifold inlet, said flap affixed to a trigger shaft and biased towards said open position;
   said frame in fluid communication with said manifold inlet, said frame having a nozzle in fluid communication with said shutoff valve, said frame having a sprinkler head in fluid communication with said shutoff valve;
   a sled affixed to said frame and having a window located at a terminal end;
   a turbine wheel located adjacent said nozzle, said turbine wheel connected to a gearbox, said gearbox selectively coupled to a spool;
   a cord having a ring located on a terminal end and connected to said spool on an end opposite said ring, said cord passing through said window on said sled, said ring being larger than said window, said cord slidably engageable with said trigger shaft on said shutoff valve;

said cord having a knot to engage said trigger shaft, said knot located between said ring and said trigger shaft;

when said shutoff valve is in said open position and said water supply is connected, said nozzle dispenses water to rotate said turbine wheel, said turbine wheel rotating said gearbox, said gearbox rotating said spool to wind up said cord and move said frame towards said ring; and when said spool winds up said cord and said ring is close to said window, said knot engages with said shutoff valve to rotate said flap from said open position towards said closed position.

8. The sprinkler of claim 7, wherein sliding said spool along a rotational axis decouples said spool from said gearbox.

9. The sprinkler of claim 7, wherein said spool is supported by a fixed shaft on said frame on one side and an output shaft of said gearbox on another side, said spool is slidable along said shafts between a coupled position and a decoupled position, said coupled position defined by a pin on said output shaft engaged with a slot in said spool, said decoupled position defined by said pin clear of said slot in said spool.

10. The sprinkler of claim 7, wherein a spring is located internally to said shutoff valve to bias said flap towards said open position.

11. The sprinkler of claim 7, further comprising a speed control valve located between said shutoff valve and said nozzle, said speed control valve for varying an amount of water from said shutoff valve that reaches said nozzle.

12. The sprinkler of claim 7, further comprising wheels freely rotatable with respect to said frame.

13. The sprinkler of claim 7, wherein said cord is coupled to said shutoff valve between said spool and said frame.

14. A sprinkler for being connected to a water supply, said sprinkler comprising:

a shutoff valve having an external trigger shaft;

a frame having freely rotatable wheels and a sled affixed thereto, said sled having a window, said sled and said wheels supporting said sprinkler;

said shutoff valve in fluid communication with a nozzle and a sprinkler head;

an exposed turbine wheel located adjacent said nozzle, said exposed turbine wheel connected to a gearbox, said gearbox selectively coupled to a spool;

a cord having a ring located on a terminal end and connected to said spool on an opposite terminal end, said cord passing through a portion of said sled and slidably constrained thereby, said cord slidably coupled to said external trigger shaft on said shutoff valve;

said cord having a knot;

when said shutoff valve is in an open position and said water supply is connected, said nozzle dispenses water to rotate said exposed turbine wheel, said exposed turbine wheel for rotating said gearbox, said gearbox for rotating said spool to wind up said cord to move said frame towards said ring; and when said spool winds up said cord, said knot engages with said shutoff valve to rotate a flap from said open position towards a closed position.

15. The sprinkler of claim 14, said shutoff having a valve inlet, in said opened position, said valve inlet is in fluid communication with said nozzle and said sprinkler head, in said closed position, said flap obstructs fluid communication between said valve inlet and said nozzle and said sprinkler head, said flap affixed to said external trigger shaft and biased towards said open position by a spring.

16. The sprinkler of claim 14, wherein sliding said spool along a rotational axis to disengage a pin from a slot in said spool decouples said spool from said gearbox.

17. The sprinkler of claim 14, wherein said spool is supported by a fixed shaft on said frame on one side and an output shaft of said gearbox on another side, said spool is slidable along said shafts between a coupled position and a decoupled position, said coupled position defined by a pin on said output shaft engaged with a slot in said spool, said decoupled position defined by said pin clear of said slot in said spool.

18. The sprinkler of claim 14, further comprising a speed control valve located between said shutoff valve and said nozzle, said speed control valve for varying an amount of water from said shutoff valve that reaches said nozzle.

19. The sprinkler of claim 14, wherein said cord is coupled to said shutoff valve between said spool and said frame.

* * * * *